(12) United States Patent
Bucksbee

(10) Patent No.: US 7,044,457 B2
(45) Date of Patent: May 16, 2006

(54) MOUNT WITH REPLACEABLE LOAD BEARING AND REBOUND MEMBERS

(75) Inventor: James H. Bucksbee, McKean, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/992,092

(22) Filed: Nov. 5, 2001

(65) Prior Publication Data

US 2003/0085499 A1    May 8, 2003

(51) Int. Cl.
  *F16F 7/00*   (2006.01)
  *F16M 13/00*  (2006.01)
(52) U.S. Cl. .................. 267/141.3; 267/136; 267/292; 267/141.1; 416/135; 248/636
(58) Field of Classification Search ............ 267/140.3, 267/140.5, 141, 141.1–141.5, 141.7, 152, 267/153, 292, 136; 248/560, 609, 636, 638; 416/106, 107, 135
See application file for complete search history.

(56) References Cited

U.S. PATENT DOCUMENTS

| | | | | |
|---|---|---|---|---|
| 2,179,959 A | * | 11/1939 | Schroedter ................. 403/224 |
| 2,232,667 A | * | 2/1941 | Saurer ...................... 267/141.1 |
| 2,414,743 A | | 1/1947 | Kaemmerling .............. 403/203 |
| 2,482,488 A | * | 9/1949 | Julien ......................... 267/33 |
| 2,522,032 A | * | 9/1950 | Gerry ..................... 244/103 R |
| 2,976,080 A | * | 3/1961 | Moore ....................... 296/35.1 |
| 3,045,998 A | | 7/1962 | Hirst ............................ 267/3 |
| 3,391,892 A | * | 7/1968 | Neidhart et al. ......... 267/141.7 |
| 3,504,901 A | | 4/1970 | Ditty ............................ 267/1 |
| 3,539,170 A | | 11/1970 | Hamel ......................... 267/63 |
| 3,584,858 A | * | 6/1971 | Beck .......................... 267/153 |
| 3,677,869 A | | 7/1972 | Chung et al. ................ 161/42 |
| 3,730,509 A | | 5/1973 | Jorn ........................... 267/152 |
| 3,809,427 A | * | 5/1974 | Bennett ...................... 296/35.1 |
| 3,823,833 A | | 7/1974 | Chung ....................... 213/40 R |
| 3,845,021 A | | 10/1974 | Dukes et al. .......... 260/75 NH |
| 3,929,729 A | | 12/1975 | Chung ................... 260/75 NH |
| 3,951,477 A | * | 4/1976 | Townshend ................. 384/440 |
| 3,955,808 A | | 5/1976 | Jorn et al. .................. 267/152 |
| 4,033,533 A | | 7/1977 | Evrard ....................... 248/632 |
| 4,073,858 A | | 2/1978 | Chung ........................ 264/262 |
| 4,180,458 A | | 12/1979 | Shahan ....................... 209/326 |
| 4,399,987 A | * | 8/1983 | Cucelli et al. ......... 267/140.13 |
| 4,460,168 A | * | 7/1984 | Obadal .................. 267/140.11 |
| 4,575,114 A | | 3/1986 | Camp .................. 280/124.152 |
| 4,856,750 A | | 8/1989 | Le Fol ....................... 248/562 |
| 4,957,279 A | | 9/1990 | Thorn .................... 267/140.5 |
| 4,962,915 A | * | 10/1990 | Thorn .................. 267/140.13 |
| 5,112,144 A | | 5/1992 | Law ........................... 384/215 |
| 5,150,657 A | | 9/1992 | Bourgeot ...................... 105/3 |

(Continued)

FOREIGN PATENT DOCUMENTS

DE    16 50 926    7/1951

(Continued)

*Primary Examiner*—Melody M. Burch
(74) *Attorney, Agent, or Firm*—Edward F. Murphy, III

(57) ABSTRACT

A mount with replaceable load bearing and rebound members is provided. The mount comprises a housing that defines a first chamber and a second chamber; a load bearing member removably located in said first chamber, said load bearing member comprising a load bearing member contact portion; a rebound member removably located in said second chamber, said rebound member having a rebound member contact portion, the contact portions of the load bearing member and rebound member being in abutment when the members are removably located in the chambers; and means for coupling said load bearing member and rebound member.

16 Claims, 6 Drawing Sheets

U.S. PATENT DOCUMENTS

| | | | | |
|---|---|---|---|---|
| 5,174,552 A | * | 12/1992 | Hodgson et al. | 267/140.11 |
| 5,271,678 A | | 12/1993 | Bourgeot | 384/221 |
| 5,286,132 A | * | 2/1994 | Morini | 403/228 |
| 5,472,226 A | | 12/1995 | Bunker | 280/681 |
| 5,718,407 A | * | 2/1998 | Lee | 248/634 |
| 5,996,981 A | * | 12/1999 | Dilling | 267/153 |
| 6,065,742 A | | 5/2000 | Whiteford | 267/140.5 |
| 6,450,474 B1 | * | 9/2002 | Bucksbee | 248/638 |
| 6,889,965 B1 | * | 5/2005 | Loftus et al. | 267/136 |
| 2002/0140146 A1 | | 10/2002 | Nakagawa | |

FOREIGN PATENT DOCUMENTS

| | | |
|---|---|---|
| DE | 40 33 569 | 10/1991 |
| EP | 0 995 928 | 4/2000 |
| GB | 2 209 716 | 5/1989 |
| JP | 3287405 A * | 12/1991 |

* cited by examiner

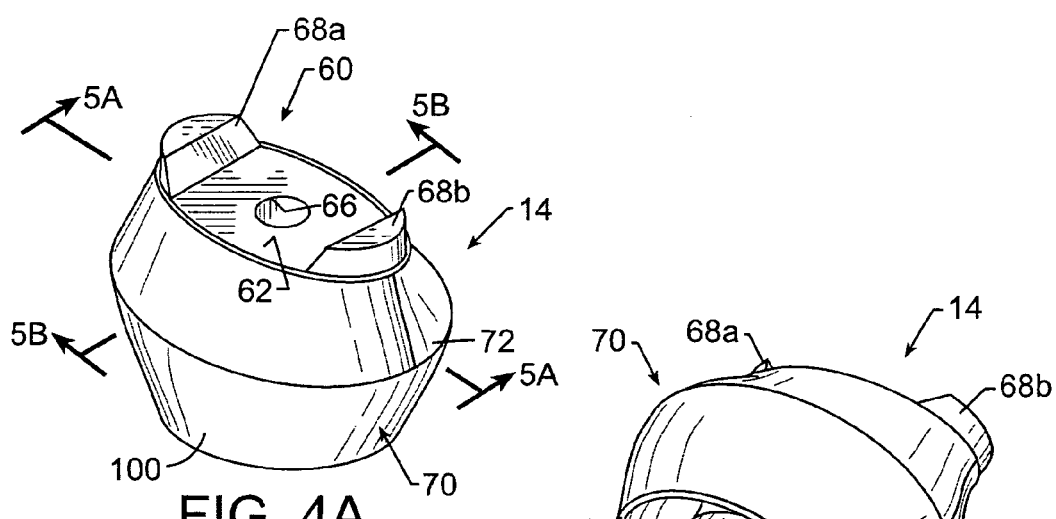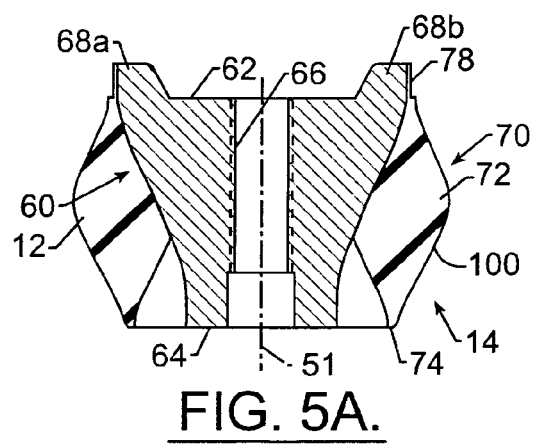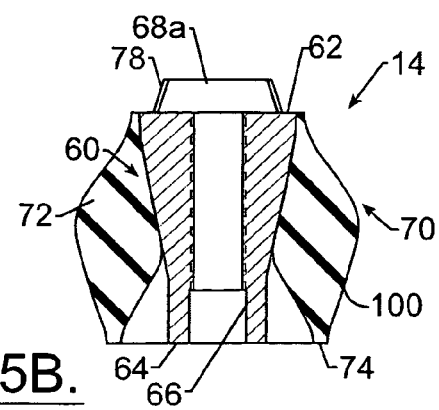

MOUNT WITH REPLACEABLE LOAD BEARING AND REBOUND MEMBERS

FIELD OF THE INVENTION

The invention relates to a device for limiting vibration between first and second structural members, and more specifically the invention relates to a mount for limiting structural vibration wherein the mount includes replaceable load bearing and rebound members.

BACKGROUND OF THE INVENTION

Vibration control members and devices such as mounts and isolators generally limit or greatly reduce the transmission of vibratory disturbances between first and second members, and such first and second members may respectively comprise a frame or base and a seat or engine for example. Well known prior art mounts comprise a suitable combination of resilient and rigid component parts and such component parts are assembled before or during mount installation. The number of discrete component parts comprising such mounts may be significant and as a result, installation and assembly of the mounts is frequently difficult and time consuming.

Over time, as a result of the repetitive vibratory loads applied to the mounts, the mounts become less effective in their control of such vibratory disturbances. Frequently, one or more of the resilient components is the first mount component part to degrade and require replacement. Repairing resilient members is difficult. In order to repair the mount, the mount must first be removed from its working environment. The resilient member, which is bonded to one or more rigid mount members, must be scraped from the rigid bonding surface or the elastic section must be otherwise removed from the bonding surface before a replacement resilient part can be effectively bonded to the rigid surface. Such repair is time consuming causing equipment down time and generally repairing prior art mounts may not be accomplished in an efficient, simple manner.

In many instances mounts are designed for use in a particular application where a typical range of magnitudes and frequencies of the vibratory disturbances is known to the person designing the mount. The mounts are designed to effectively reduce the vibratory disturbances expected to be encountered within the known identified range of magnitudes and frequencies. As part of the design process a resilient material believed to be suitable for such an application environment is integrated into the mount design. In practice, it may be determined that the resilient material is not effective for the specific application. For example, the mount may ultimately be used in an environment that produces vibratory disturbances that are outside the previously identified anticipated range of magnitudes and frequencies. As a result, in order to effectively reduce such changed vibratory conditions, it is desirable to more precisely tune the mount by replacing the selected resilient material with a different material that is deemed to be better suited to reduce the actual vibratory disturbances. Tuning the elastomer in present prior art mounts is difficult. Typically in order to tune the mount, the mount must be replaced. Due to the cost associated with such replacement, the mounts are usually not replaced and precisely tuned to the stiffness required for an actual application environment. As a result, the seat occupant, vehicle operator or component part or system is exposed to vibratory disturbances which affect the useful life of the mechanical components and will likely impart significant discomfort to the seat occupant or vehicle operator.

The foregoing illustrates limitations known to exist in present mounts. Thus, it is apparent that it would be advantageous to provide an alternative that allows the mount to be easily repaired and accurately tuned for changing operating environments and at the same time offer elastic characteristics difficult to obtain in prior art mounts. Accordingly, a suitable alternative mount is provided including features more fully disclosed hereinafter.

SUMMARY OF THE INVENTION

In one aspect of the present invention this is accomplished by providing a mount with replaceable load bearing and rebound members. The mount of the present invention is easily tuned to effectively limit vibratory disturbances between structural members. The mount of the present invention does not comprise a large number of discrete components. The mount of the present invention comprises a housing, a load bearing member, a rebound member and means for removably seating the load bearing and rebound members within the housing. The mount provides fore/aft and lateral snubbing. Repair and replacement of mount components is greatly simplified by the mount of the present invention.

More specifically The mount of the present invention comprises a housing that defines a first chamber and a second chamber; a load bearing member removably located in said first chamber, said load bearing member comprising a load bearing member contact portion; a rebound member removably located in said second chamber, said rebound member having a rebound member contact portion, the contact portions of the load bearing member and rebound member being in abutment when the members are removably located in the chambers; and means for coupling said load bearing member and rebound member to maintain the contact portions in abutment.

The foregoing and other aspects will become apparent from the following detailed description of the invention when considered in conjunction with the accompanying drawing figures.

BRIEF DESCRIPTION OF THE DRAWINGS

FIG. 4A is a top isometric view of the load bearing member of the mount of the present invention.

FIG. 4B is a bottom isometric view of the load bearing member of FIG. 4A.

FIG. 5A is a sectional view taken along line 5A—5A of FIG. 4A.

FIG. 5B is a sectional view taken along line 5B—5B of FIG. 4A.

DETAILED DESCRIPTION OF THE PREFERRED EMBODIMENT

Figure 1:
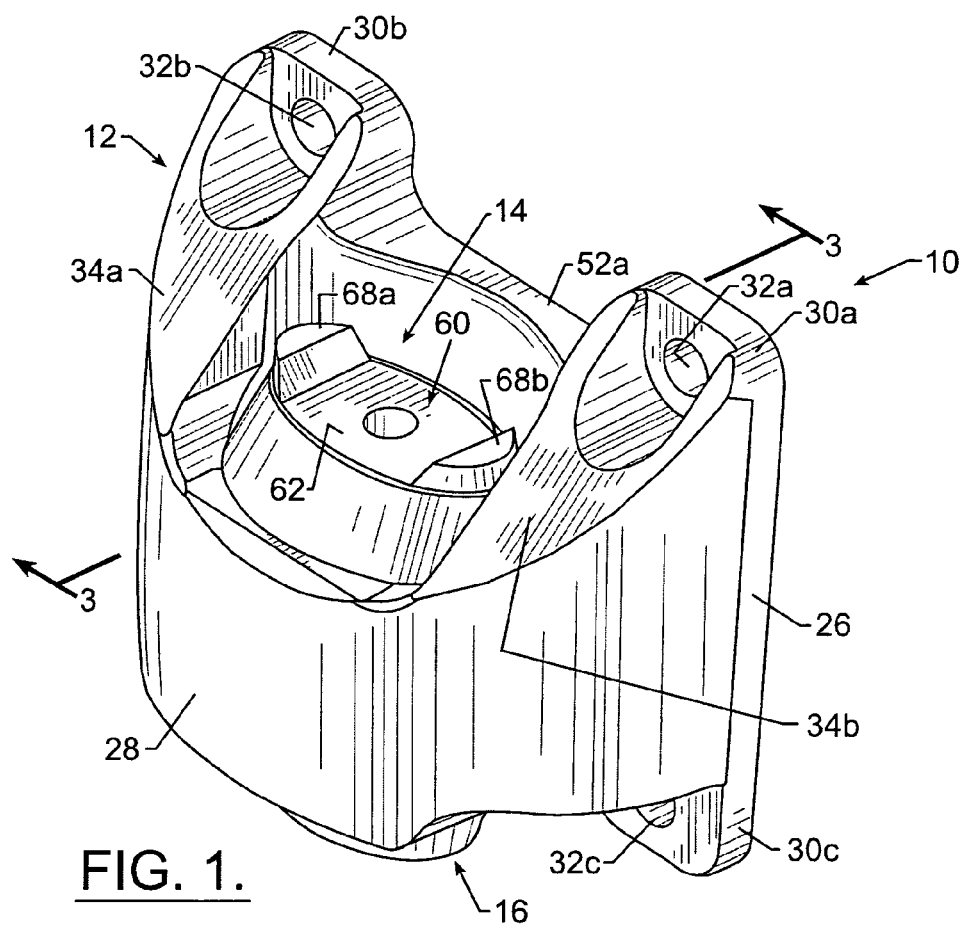
FIG. 1 is a front isometric view of the mount of the present invention.
Figure 3:
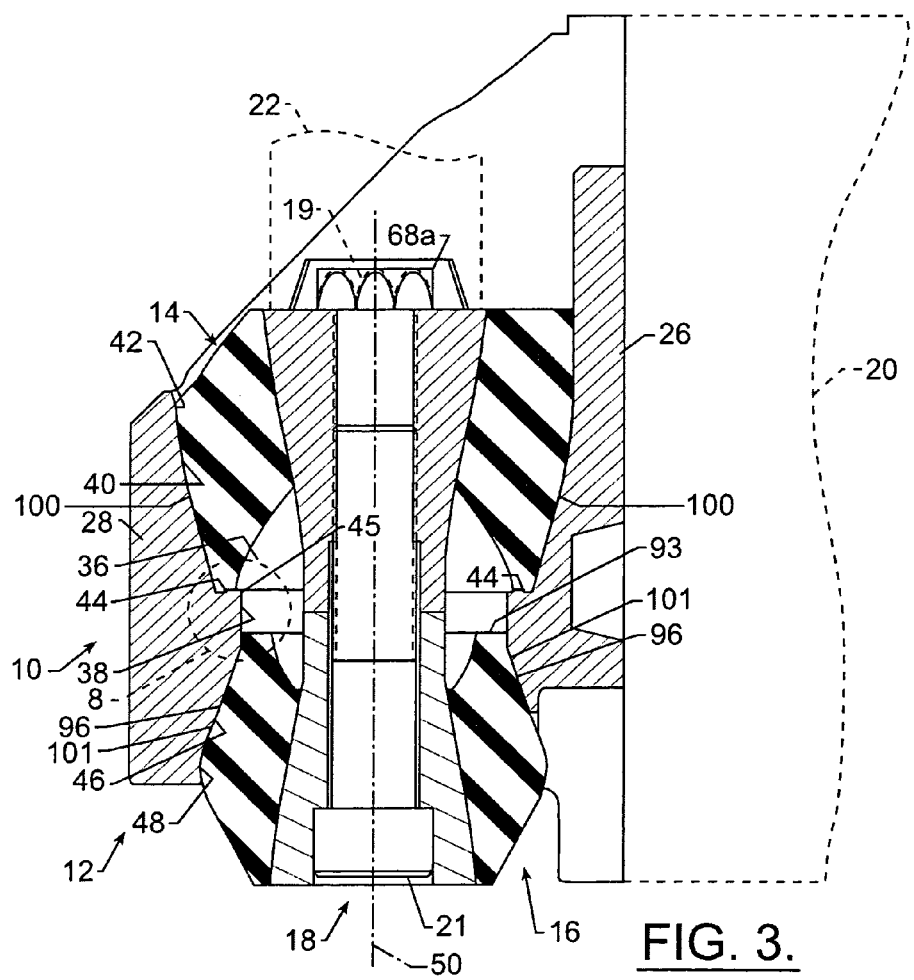
FIG. 3 is a lateral sectional view taken along line 3—3 of FIG. 1.
Figure 6A:
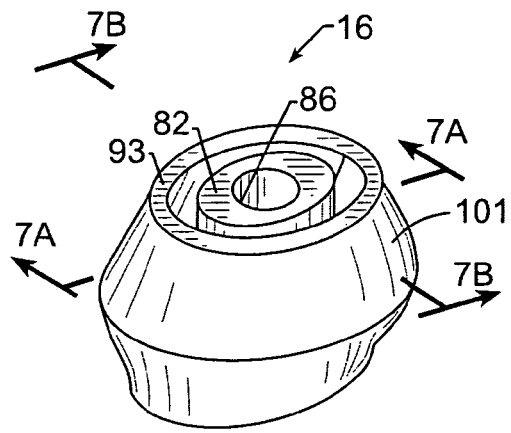
FIG. 6A is a top isometric view of the rebound member of the mount of the present invention.
Figure 6B:
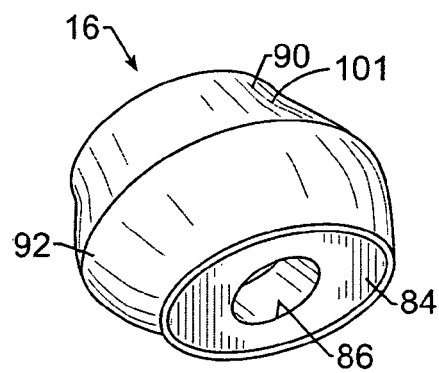
FIG. 6B is a bottom isometric view of the rebound member of FIG. 6A.
Figure 7A:
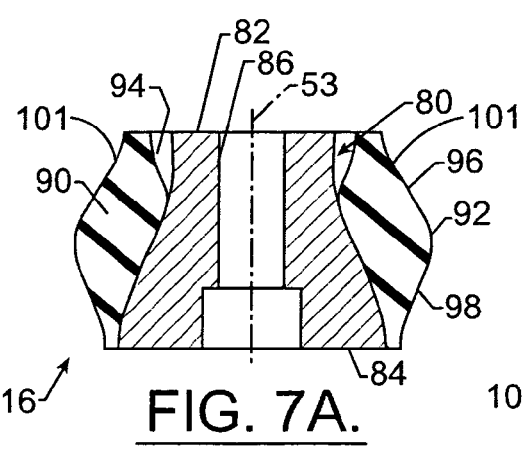
FIG. 7A is a sectional view taken along line 7A—7A of FIG. 6A.
Figure 7B:
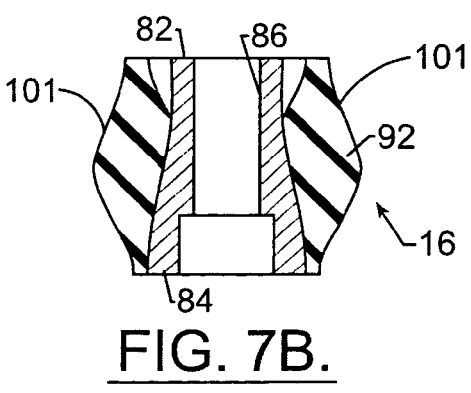
FIG. 7B is a sectional view taken along line 7B—7B of FIG. 6A.

Now turning to the drawing Figures wherein like parts are referred to by the same numbers in the several views, FIG. 1 illustrates mount 10 of the present invention comprising housing 12, replaceable load bearing member 14 and replaceable rebound member 16 where both members are removably seated in the housing 12. The members are removably coupled together by coupling means 18, illustrated in FIG. 3. As will be described in greater detail hereinbelow the replaceable load bearing and rebound members allow the mount of the present invention to be easily repaired and accurately tuned as required to effectively reduce or limit vibratory disturbances. As illustrated in FIG. 3, the mount 10 of the present invention is located between first structural member 20 which may be a frame and a second structural member 22 which may be an engine support flange for example. The mount 10 limits the transmission of vibratory disturbances between the members 20 and 22. The structural members 20 and 22 do not form part of the present invention and are therefore represented dashed in FIG. 3. Members 20 and 22 are provided to generally illustrate the interconnection between the mount and the structural members and to illustrate the typical orientation of the mount in use.

Figure 2:
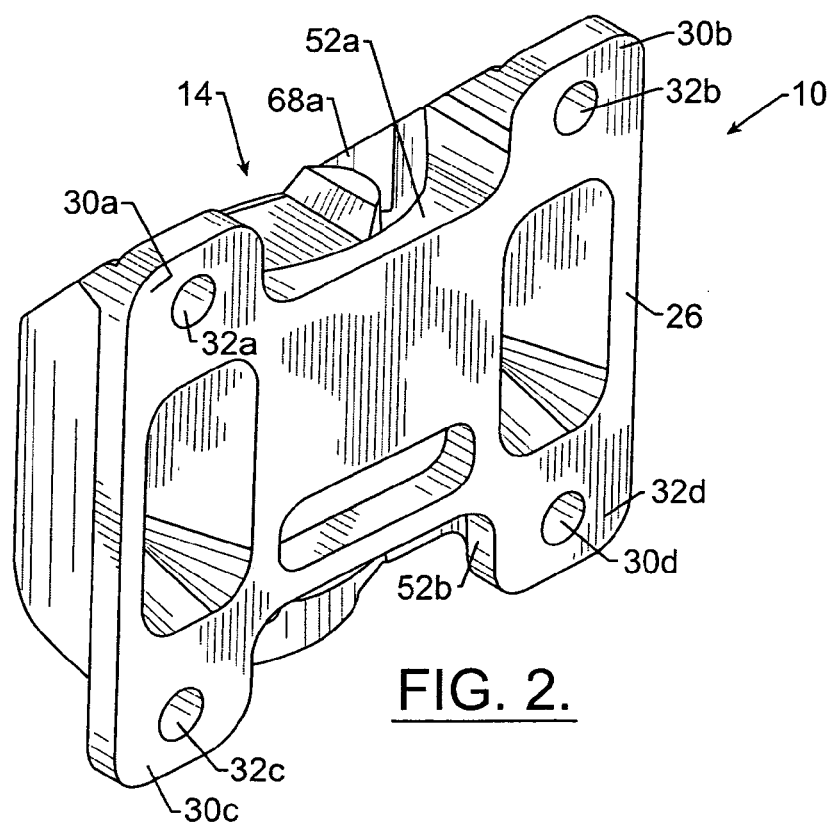
FIG. 2 is a rear isometric view of the mount of FIG. 1.

As shown in FIG. 1 and FIG. 2 the housing 12 is unitary and may be made from any suitable relatively rigid material such as steel or aluminum for example. The housing comprises an H-shaped base 26, hollow barrel 28 and arms 34a and 34b that extend between the barrel and base. The barrel, base and arms of the unitary housing 12 are illustrated in FIG. 1. The base includes four attachment flanges 30a, 30b, 30c and 30d that are spaced apart in a rectangular array to form an H-shaped arrangement. Attachment members (not shown) such as bolts for example are passed through openings 32a, 32b, 32c and 32d provided in each of the respective attachment flanges to attach the housing to the first structural member 20. By providing four flanges spaced apart in a rectangular pattern the mount 10 is securely attached to the first structural member 20. It should be understood that the H-shaped base is provided for purposes of describing the preferred embodiment of the invention and that the flanges and base may comprise any suitable configuration that provided the requisite mount stability when it is located between the members 20 and 22. Mount base 26 may comprise any suitable number of attachment flanges but it is generally preferred that at least three attachment flanges be provided in spaced apart relation in order to establish stable connection between the base 26 and member 20 so that the mount is not susceptible to bending during use. Although the base is described as being substantially parallel to axis 50, it should be understood that for a different configuration first structural member 20 and member 22, the base may be oriented at an angle relative to axis 50, such as perpendicular thereto.

The barrel 28 defines first and second chambers 36 and 38 which are adapted to removably receive load bearing member 14 and rebound member 16 respectively therein. See FIG. 3. Wall 40 defines first chamber 36 and the wall 40 is tapered or contoured inwardly as the wall extends in axial direction 50 from elliptical chamber mouth 42 at one chamber end to elliptical seat 44 at the opposite chamber end. The seat defines an opening 45 for communicating between the chambers 36 and 38. The seat 44 is directed inwardly from wall 40 substantially perpendicular to axis 50. Wall 46 defines chamber 38 and the wall 46 is tapered or contoured inwardly as the wall extends in the axial direction 50 from elliptical mouth 48 to seat 44. As shown in FIG. 3 the chambers 36 and 38 are in communication and the seat defines the common opening 45 between the first and second chambers. The radially inwardly tapered walls 40 and 46 provide means for producing the desired precompression in the resilient portions of respective members 14 and 16 when the members 14 and 16 are seated in respective chambers 36 and 38 and moved into axial abutment by coupling means 18. Such precompression will be described in greater detail hereinbelow.

Undercut 52a is provided in the base between attachment flanges 30a and 30b and undercut 52b is provided in the base between attachment flanges 30c and 30d. The undercuts permit a technician to insert tools, fasteners or other implements therethrough and thereby easily access attachment members or components located behind base 26 and possibly near member 20 when the mount 10 is in its fixed located between members 20 and 22. For example, the undercuts may accommodate bolt heads and wrenches to tighten or loosen bolts attached to member 20.

Now turning to the load bearing member 14 illustrated discretely in FIGS. 4A, 4B, 5A and 5B; and rebound member 16 illustrated discretely in FIGS. 6A, 6B, 7A and 7B, as shown in the Figures the load bearing and rebound members comprise substantially elliptical cross sections that are variable axially along axis of operation 50. The cross sections of reference are perpendicular to axis 50. As shown in FIG. 3, the members 14 and 16 have lateral dimensions that are variable along axis 50 and as a result are tapered or contoured between the member ends along axis 50. The load bearing member 14 supports the static load supplied by member 22 and the rebound member 16 biases the mount axially back to its un-displaced orientation and location. The members 14 and 16 may have the same or different stiffness and elasticity, the members may be dimensionally different or substantially the same, and the members may be comprised of substantially the same or different components. As shown in FIGS. 3 and 4A–7B for purposes of describing the preferred embodiment of mount 10, the members 14 and 16 are dimensionally different and include substantially the same components, however the components are of slightly different shapes and dimensions.

The load bearing member 14 will now be specifically described. The load bearing member 14 comprises a rigid inner member 60 which may be made from any suitable material including, but not limited to steel, plastic or aluminum for example. The inner member 60 has an elliptical cross section that is variable axially along axis 51. In general, the cross sectional area for each elliptical cross section is variable along the direction defined by axis 51. When the member 14 is in use axis 51 is aligned with axis 50. As a result of the variable cross sectional area, the inner member includes an inwardly directed taper as the member 60 extends along axis 51 between the member free ends defined by surfaces 62 and 64. Support surface 62 is located at one of the free ends of inner member 60 and the support surface 62 is adapted to receive engine flange 22 thereon as shown in FIG. 3. A contact portion or surface 64 is spaced axially from surface 62 and is located at the opposite free member end. Bore 66 extends along axis 51 and connects the surfaces 62 and 64. The bore is adapted to receive fastener 19 of coupling means 18. As shown in FIGS. 4A and 5A, a pair of opposed upwardly extending alignment members 68a and 68b are provided along support surface 62. The alignment members serve to guide the structural member 22 to the desired seating location on surface 62 to ensure the member 22 is properly centered and supported. Also, by properly centering the flange on surface 62, passing member 19 through the openings on the surface 62 and member 22 is greatly simplified. Each alignment member 68a, 68b includes a taper directed inwardly towards axis 51 as the tapered surfaces extend from the free alignment member ends to the support surface 62.

Although the inner member 60 is shown and described as having elliptically shaped surfaces 62 and 64 joined by an inwardly tapered body, it should be understood that the surfaces may comprise any suitable polygonal shape, including but not limited to circles, squares, rectangles, and triangles and it is preferred that the surfaces be joined by a tapered body in order to produce the desired precompression in the resilient member 70 of member 14.

Resilient member 70 is bonded to the inner member 60 using a conventional molding process well known to one skilled in the art, and such molding process may comprise a transfer, injection or compression molding operation or a combination of two or more methods, for example. The resilient member may be made from any material that provides the required stiffness and elasticity. For example, the resilient material may comprise a natural rubber having a durometer value of 40. The resilient member 70 includes an annular transition 72. As seated in chamber 36, the portion of member 14 between the transition and surface 62 is located outside of the chamber. See FIG. 1. The resilient portion 70 has an inwardly directed taper between the transition and annular lip 74, with unbounded outer surface 100 radially inwardly tapered. The lip is substantially located in the plane defined by contact surface 64. As shown in FIG. 3, the unbounded outer surface 100 of the tapered portion of the resilient member is located against chamber wall 40 and annular lip is located on seat 44 when the member 14 is removably located in chamber 36. A bulge cavity 76 is defined between the resilient member 70 and the end of the inner member 60 at surface 64. The bulge cavity is adapted to receive resilient material 70 that bulges as a result of axial compression and/or radial loading to the member 14. Such radial loading may more specifically be described as loading that is perpendicular to axis 50.

Relatively thin stress relief layers 78 are provided along the exterior of the alignment members and provide a means for relieving stress concentrations that build up proximate members 68a and 68b as a result of the repetitive flexing to the member 70.

Rebound member 16 will now be described in further detail. The rebound member comprises a rigid inner member 80 made from a suitable material such as steel, plastic or aluminum for example, and the inner member comprises a contact surface 82 adapted to be in axial abutment with contact portion 64 of load bearing member 14 when the members 14 and 16 are located in their respective housing chambers 36 and 38. The inner member also comprises a support surface 84 spaced away from surface 82 along axis 53. The surfaces 82 and 84 are elliptical and are joined by a tapered body. The inner member body tapers inwardly along axis 53 from surface 84 to surface 82. In this way, the cross section of the member 80 is elliptical and is variable between the end surfaces along axis 53. Bore 86 connects the surfaces 82 and 84 and is adapted to receive a cap screw 21 or other means for coupling the members 14 and 16.

The rebound member comprises an outer resilient member 90 that is bonded to the inner member 80 using a conventional molding process such as a transfer molding, injection molding or compression molding operation, or a combination of two or more of such molding operations for example. The resilient member 90 substantially covers the inner member 80 and the resilient member includes an outwardly directed annular transition 92. The resilient member is tapered inwardly toward axis 53 between the transition 92 and contact surface 82 and this portion of the resilient member 90 is identified as 96 in FIG. 7A, with unbounded outer surface 101 radially tapered. The resilient member 90 is also tapered inwardly toward axis 53 between transition 92 and support surface 84 and is identified as 98 in FIG. 7A. For purposes of the preferred embodiment of the present invention, resilient member 90 may comprise a natural rubber having a durometer value of 30. In an alternate embodiment the stiffness and elasticity of the resilient members may be the same. Turning to FIG. 3, when the member 16 is seated in chamber 38, the unbounded outer surface 101 of resilient portion 96 is seated against chamber wall 46 and resilient portion 98 is located outside of the chamber 38. The respective contact portions 64 and 82 are in abutment when the members 14 and 16 are properly seated in the housing chambers and coupling means is located in the bores 66 and 86.

A bulge cavity 94 is defined between resilient member 90 and inner member 80 at the end of inner member 80 that includes contact surface 82. Like bulge cavity 76 of member 14, bulge cavity 94 receives the portion of the resilient member 90 that bulges into the cavity 94 during compression and/or radial loading (as defined for bulge cavity 76) of the member 90.

Assembly of the mount 10 and replacement of members 14 and 16 after the mount is installed between members 20 and 22 will now be described. The base 26 is removably fixed to member 20 and the members 14 and 16 are located in their respective chambers 36 and 38 of housing 12. The second support member 22 is seated on support surface 62 of member 14. Fastener 19 is then is passed through flange 22 and bore 66 and into bore 86. The bores are aligned along axis 50. Lip 74 of load bearing member 14 is located on seat 44 and the resilient members 70 and 90 are in contact with respective chamber walls 40 and 46. Before tightening the coupling means contact portions 84 and 64 may be in light abutment. The resilient members 70 and 90 are not measurable compressed before the coupling means 18 is tightened. The cap screw 21 is then located in bore 86 and member 21 is tightened onto fastener 19. As the fastener and cap screw 21 are tightened, the members are drawn together along axis 50. As a result, contact surfaces 64 and 82 are moved into hard abutment and resilient portion 90 of of rebound member 16 is precompressed between wall 46 and inner member 80 and resilient portion 70 of of load bearing member 14 is precompressed between wall 40 and inner member 60.

Figure 8:
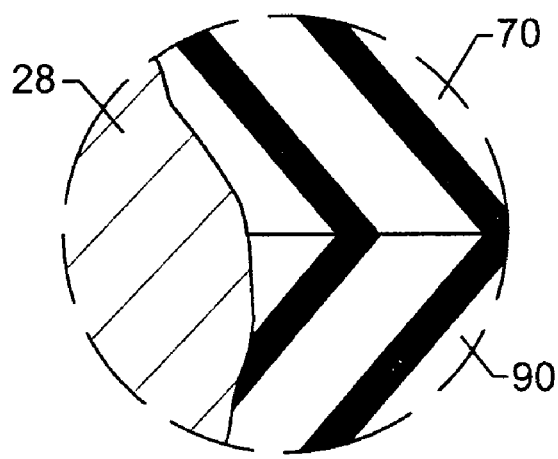
FIG. 8 is an enlarged partial view of the area identified as 8 in FIG. 3 and the partial view shows an alternate embodiment for abutting the load bearing and rebound members.
Figure 9:
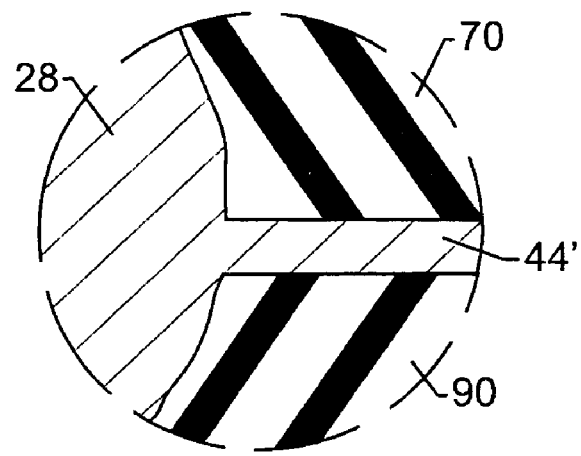
FIG. 9 is an enlarged partial view of the area identified in FIG. 8 illustrating a further alternate embodiment for abutting the rebound and load bearing members.

It should be understood that the mount of the present invention may be modified from the embodiment disclosed hereinabove for purposes of disclosing the best mode for practicing the invention. For example, the load bearing and rebound members may be substantially the same. When the members are seated in the respective chambers the lips 74 and 93 may be in abutment. See FIG. 8. The abutment of the peripheral lips 74 and 93 may be in addition to the abutment between the contact surfaces 82 and 64 or may replace the contact surface abutment. Alternatively, both peripheral lips 74 and 93 may be located on opposed sides of a suitable seat 44'. See FIG. 9. The seat would extend inwardly in the manner like seat 44 and would provide a surface whereupon lip 93 would be located. Seating the lips 74 and 93 on opposed seating surfaces may replace or supplement the abutment between contact surfaces 82 and 64.

In order to replace a degraded member 14, 16 or change the stiffness characteristics of the mount 10, the coupling member is first removed and then either or both of the members is or are removed from one or both chamber(s). New members are seated in the chambers and the bolt is tightened in the manner described above. In an alternate embodiment, if the rebound and load bearing members and their chambers are suitably dimensioned, and if desirable, the rebound member 16 could be located in chamber 36 and become the new load bearing member and the original load bearing member could be located in chamber 38 and become the new rebound member. In such a configuration, the load bearing member would be uploaded against seat 44 when the coupling means is tightened.

While I have illustrated and described a preferred embodiment of my invention, it is understood that this is capable of modification and therefore I do not wish to be limited to the precise details set forth, but desire to avail myself of such changes and alterations as fall within the purview of the following claims.

I claim:

1. A mount comprising: a rigid housing, said housing having a hollow barrel with a central axis and a first end and an opposing second end, said hollow barrel defining a first chamber proximate said hollow barrel first end, a second chamber proximate said hollow barrel second end, and an opening communicating between said first chamber and said second chamber, said opening between said hollow barrel first end and said hollow barrel second end, with said first chamber, said opening and said second chamber aligned along said hollow barrel central axis, said first chamber having a first chamber mouth and a first chamber seat end with said first chamber mouth proximate said hollow barrel first end and said first chamber seat end proximate said opening, said first chamber having a conically contoured wall inwardly tapered from said first chamber mouth to said first chamber seat end, said second chamber having a second chamber mouth and a second chamber seat end with said second chamber mouth proximate said hollow barrel second end and said second chamber seat end proximate said opening, said second chamber having a conically contoured wall inwardly tapered from said second chamber mouth to said second chamber seat end, a load bearing member, said load bearing member having a load bearing mouth end and a load bearing seat end, said load bearing member comprised of a molding bonded load bearing member outer resilient member bonded to a load bearing member inner rigid member, said load bearing member inner rigid member having a load bearing member support surface proximate said load bearing mouth end and a load bearing member opposing contact surface proximate said load bearing seat end, said load bearing member inner rigid member having an inwardly directed taper from said support surface to said contact surface, said load bearing member outer resilient member having an unbonded outer surface distal from said inner rigid member, said load bearing member outer resilient member unbonded outer surface radially inwardly tapered in a direction from said first chamber mouth to said first chamber seat end proximate said load bearing seat end, said load bearing member outer resilient member having a resilient portion between said load bearing member outer resilient member inwardly tapered unbonded outer surface and said load bearing member inner rigid member inwardly directed taper, a rebound member, said rebound member having a rebound mouth end and a rebound seat end, said rebound member comprised of a molding bonded rebound member outer resilient member bonded to a rebound member inner rigid member, said rebound member inner rigid member having a rebound member support surface proximate said rebound mouth end and a rebound member opposing contact surface proximate said rebound seat end, said rebound member inner rigid member having an inwardly directed taper from said rebound member support surface to said rebound member contact surface, said rebound member outer resilient member having a rebound member unbonded outer surface distal from said rebound member inner rigid member, said rebound member outer resilient member unbonded outer surface radially inwardly tapered in a direction from said second chamber mouth to said second chamber seat end proximate said rebound seat end, said rebound member outer resilient member having a resilient portion between said rebound member outer resilient member inwardly tapered unbonded outer surface and said rebound member inner rigid member inwardly directed taper, and a coupling member, said coupling member drawing said load bearing member inner rigid member and said rebound member inner rigid member together along said rigid housing hollow barrel central axis through said rigid housing hollow barrel opening wherein said load bearing member inner rigid member contact surface and said rebound member inner rigid member contact surface are in direct abutment, and said load bearing member outer resilient member inwardly tapered unbonded outer surface seated against said first chamber inwardly tapered wall, said load bearing member outer resilient member resilient portion precompressed between said load bearing member inner rigid member inwardly directed taper and said first chamber inwardly tapered wall, and said rebound member outer resilient member inwardly tapered unbonded outer surface seated against said second chamber inwardly tapered wall, said rebound member outer resilient member resilient portion precompressed between said rebound member inner rigid member inwardly directed taper and said second chamber inwardly tapered wall.

2. The mount as claimed in claim 1 wherein said load bearing member outer resilient member unbonded outer surface has a peripheral portion and said rebound member outer resilient member unbonded outer surface has a peripheral portion, said load bearing member outer resilient member unbonded outer surface peripheral portion in abutment with said rebound member outer resilient member unbonded outer surface peripheral portion.

3. The mount as claimed in claim 1 wherein said rigid housing has a seat proximate said opening, and said load bearing member outer resilient member unbonded outer surface has a peripheral portion and said rebound member outer resilient member unbonded outer surface has a peripheral portion, with said load bearing member outer resilient member unbonded outer surface peripheral portion located on said rigid housing seat and said rebound member outer resilient member unbonded outer surface peripheral portion located on said rigid housing seat.

4. The mount as claimed in claim 1 wherein the load bearing member has a substantially elliptical cross section.

5. The mount as claimed in claim 1 wherein the rebound member has a substantially elliptical cross section.

6. The mount as claimed in claim 1 wherein the rebound member and load bearing member comprise said resilient portions, said resilient portions being in compression.

7. The mount as claimed in claim 1 wherein a portion of the load bearing member is located outside the first chamber.

8. The mount as claimed in claim 1 wherein the housing is unitary and further comprises a mount base.

9. The mount as claimed in claim 8 wherein said mount base is H-shaped.

10. The mount as claimed in claim 8 wherein the mount base comprises at least three attachment flanges.

11. The mount as claimed in claim 8 wherein said mount further comprises a plurality of arms, said arms extend between the mount base and barrel.

12. The mount as claimed in claim 1 wherein a bulge cavity is defined between the load bearing inner rigid member and the load bearing member outer resilient member.

13. The mount as claimed in claim 12 wherein the bulge cavity is defined adjacent the load bearing member contact surface.

14. The mount as claimed in claim 1 wherein the load bearing member comprises a plurality of alignment members along the load bearing member support surface.

15. A mount comprising:
(a) a housing, said housing having a hollow barrel with a central axis and a first end and an opposing second end, said hollow barrel defining a first chamber proximate said hollow barrel first end, a second chamber proximate said hollow barrel second end, and a opening communicating between said first chamber and said second chamber, said opening between said hollow barrel first end and said hollow barrel second end, with said first chamber, said opening and said second chamber aligned along said hollow barrel central axis, said first chamber having a first chamber mouth and a first chamber seat end with said first chamber mouth proximate said hollow barrel first end and said first chamber seat end proximate said opening, said first chamber having a contoured wall inwardly tapered from said first chamber mouth to said first chamber seat end, said second chamber having a second chamber mouth and a second chamber seat end with said second chamber mouth proximate said hollow barrel second end and said second chamber seat end proximate said opening, said second chamber having a contoured wall inwardly tapered from said second chamber mouth to said second chamber seat end;
(b) a load bearing member removably located in said first chamber, said load bearing member comprising a load bearing mouth end and a load bearing seat end, said load bearing member having a molding bonded load bearing member outer resilient member bonded to a load bearing member inner rigid member, said load bearing member inner rigid member having a load bearing member support surface proximate said load bearing mouth end and a load bearing member opposing contact surface proximate said load bearing seat end, said load bearing member inner rigid member having an inwardly directed taper from said support surface to said contact surface, said load bearing member outer resilient member having an unbonded outer surface distal from said inner rigid member, said load bearing member outer resilient member unbonded outer surface radially inwardly tapered in a direction from said first chamber mouth to said first chamber seat end proximate said load bearing seat end, said load bearing member outer resilient member having a resilient portion between said load bearing member outer resilient member inwardly tapered unbonded outer surface and said load bearing member inner rigid member inwardly directed taper;
(c) a rebound member removably located in said second chamber, said rebound member comprising a rebound mouth end and a rebound seat end, said rebound member having a molding bonded rebound member outer resilient member bonded to a rebound member inner rigid member, said rebound member inner rigid member having a rebound member support surface proximate said rebound mouth end and a rebound member opposing contact surface proximate said rebound seat end, said rebound member inner rigid member having an inwardly directed taper from said rebound member support surface to said rebound member contact surface, said rebound member outer resilient member having a rebound member unbonded outer surface distal from said rebound member inner rigid member, said rebound member outer resilient member unbonded outer surface radially inwardly tapered in a direction from said second chamber mouth to said second chamber seat end proximate said rebound seat end, said rebound member outer resilient member having a resilient portion between said rebound member outer resilient member inwardly tapered unbonded outer surface and said rebound member inner rigid member inwardly directed taper; and
(d) means for coupling said load bearing member and said rebound member along said housing hollow barrel central axis through said rigid housing hollow barrel opening wherein said load bearing member inner rigid member contact surface and said rebound member inner rigid member contact surface are in direct abutment and thereby compressing the load bearing member outer resilient member resilient portion with said load bearing member outer resilient member inwardly tapered unbonded outer surface seated against said first chamber inwardly tapered wall, said load bearing member outer resilient member resilient portion compressed between said load bearing member inner rigid member inwardly directed taper and said first chamber inwardly tapered wall, and said rebound member outer resilient member inwardly tapered unbonded outer surface seated against said second chamber inwardly tapered wall, said rebound member outer resilient member resilient portion compressed between said rebound member inner rigid member inwardly directed taper and said second chamber inwardly tapered wall.

16. A method of assembling a mount, said method comprising providing a rigid housing, said housing having a hollow barrel with a central axis and a first end and an opposing second end, said hollow barrel defining a first chamber proximate said hollow barrel first end, a second chamber proximate said hollow barrel second end, and a opening communicating between said first chamber and said second chamber, said opening between said hollow barrel first end and said hollow barrel second end, with said first chamber, said opening and said second chamber aligned along said hollow barrel central axis, said first chamber having a first chamber mouth and a first chamber seat end with said first chamber mouth proximate said hollow barrel first end and said first chamber seat end proximate said opening, said first chamber having a conically contoured wall inwardly tapered from said first chamber mouth to said first chamber seat end, said second chamber having a second chamber mouth and a second chamber seat end with said second chamber mouth proximate said hollow barrel second end and said second chamber seat end proximate said opening, said second chamber having a conically contoured wall inwardly tapered from said second chamber mouth to said second chamber seat end, providing a load bearing member, said load bearing member having a load bearing mouth end and a load bearing seat end, said load bearing member comprised of a molding bonded load bearing member outer resilient member bonded to a load bearing member inner rigid member, said load bearing member inner rigid member having a load bearing member support surface proximate said load bearing mouth end and a load bearing member opposing contact surface proximate said load bearing seat end, said load bearing member inner rigid member having an inwardly directed taper from said support surface to said contact surface, said load bearing member outer resilient member having an unbonded outer surface distal from said load bearing member inner rigid member, said load bearing member outer resilient member unbonded outer surface radially inwardly tapered in a direction from said first chamber mouth to said first chamber seat end proximate said load bearing seat end, said load bearing member outer resilient member having a resilient portion between said load bearing member outer resilient member inwardly tapered unbonded outer surface and said load bearing member inner rigid member inwardly directed taper, providing a rebound member, said rebound member having a rebound mouth end and a rebound seat end, said rebound member comprised of a molding bonded rebound member outer resilient member bonded to a rebound member inner rigid member, said rebound member inner rigid member having a rebound member support surface proximate said rebound mouth end and a rebound member opposing contact surface proximate said rebound seat end, said rebound member inner rigid member having an inwardly directed taper from said rebound member support surface to said rebound member contact surface, said rebound member outer resilient member having an unbonded outer surface distal from said rebound member inner rigid member, said rebound member outer resilient member unbonded outer surface radially inwardly tapered in a direction from said second chamber mouth to said second chamber seat end proximate said rebound seat end, said rebound member outer resilient member having a resilient portion between said rebound member outer resilient member inwardly tapered unbonded outer surface and said rebound member inner rigid member inwardly directed taper, drawing said load bearing member inner rigid member and said rebound member inner rigid member together along said rigid housing hollow barrel central axis through said rigid housing hollow barrel opening wherein said load bearing member inner rigid member contact surface and said rebound member inner rigid member contact surface are in direct abutment wherein said load bearing member outer resilient member inwardly tapered unbonded outer surface is seated against said first chamber inwardly tapered wall, said load bearing member outer resilient member resilient portion precompressed between said load bearing member inner rigid member inwardly directed taper and said first chamber inwardly tapered wall, and said rebound member outer resilient member inwardly tapered unbonded outer surface seated against said second chamber inwardly tapered wall, said rebound member outer resilient member resilient portion precompressed between said rebound member inner rigid member inwardly directed taper and said second chamber inwardly tapered wall.

* * * * *